(12) United States Patent
Lo et al.

(10) Patent No.: US 10,931,349 B2
(45) Date of Patent: Feb. 23, 2021

(54) USER EQUIPMENT AND METHOD FOR GRANT-FREE UPLINK TRANSMISSION

(71) Applicant: INDUSTRIAL TECHNOLOGY RESEARCH INSTITUTE, Hsinchu (TW)

(72) Inventors: Li-Chung Lo, Taichung (TW); Chien-Min Lee, Taoyuan (TW); Tsung-Hua Tsai, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 146 days.

(21) Appl. No.: 16/418,288

(22) Filed: May 21, 2019

(65) Prior Publication Data

US 2019/0372639 A1 Dec. 5, 2019

Related U.S. Application Data

(60) Provisional application No. 62/674,069, filed on May 21, 2018.

(51) Int. Cl.
*H04B 7/06* (2006.01)
*H04W 24/08* (2009.01)
(Continued)

(52) U.S. Cl.
CPC ......... *H04B 7/0617* (2013.01); *H04L 5/0048* (2013.01); *H04W 24/08* (2013.01); *H04W 72/0413* (2013.01)

(58) Field of Classification Search
None
See application file for complete search history.

(56) References Cited

U.S. PATENT DOCUMENTS

| 8,320,341 B2 | 11/2012 | Malkamaki et al. |
| 8,634,364 B2 | 1/2014 | Barbieri et al. |

(Continued)

FOREIGN PATENT DOCUMENTS

| CN | 107889231 A | 4/2018 |
| CN | 107995636 A | 5/2018 |

(Continued)

OTHER PUBLICATIONS

Taiwanese Office Action and Search Report for Taiwanese Application No. 108117414, dated Apr. 9, 2020.
(Continued)

*Primary Examiner* — Diane L Lo
(74) *Attorney, Agent, or Firm* — Birch, Stewart, Kolasch & Birch, LLP

(57) ABSTRACT

Provided is a method of grant-free uplink transmission for a user equipment. The user equipment receives a grant-free configuration parameter. The user equipment receives at least one reference signal. The user equipment performs channel measurement based on the at least one reference signal. The user equipment decides at least one uplink beamforming weight or at least one precoder based on the at least one reference signal. The user equipment performs grant-free uplink transmission based on the decided at least one uplink beamforming weight or the at least one precoder and the grant-free configuration parameter.

42 Claims, 13 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 8,879,454 | B2 | 11/2014 | Yu et al. |
| 9,681,430 | B2 | 6/2017 | Rune et al. |
| 10,141,988 | B1* | 11/2018 | Hessler ................ H04B 7/0641 |
| 10,462,796 | B2* | 10/2019 | Frenne ................ H04B 7/0404 |
| 2013/0003788 | A1 | 1/2013 | Marinier et al. |
| 2016/0219627 | A1 | 7/2016 | Au et al. |
| 2018/0139774 | A1 | 5/2018 | Ma et al. |
| 2020/0059960 | A1* | 2/2020 | Shimezawa ........... H04W 72/12 |
| 2020/0146032 | A1* | 5/2020 | Bae ........................... H04L 1/08 |

FOREIGN PATENT DOCUMENTS

| | | |
|---|---|---|
| CN | 108024360 A | 5/2018 |
| TW | 201729572 A | 8/2017 |
| TW | I621369 B | 4/2018 |
| TW | 201836391 A | 10/2018 |
| WO | WO 2018/059173 A1 | 4/2018 |
| WO | WO 2018/076956 A1 | 5/2018 |
| WO | WO 2018/086541 A | 5/2018 |
| WO | WO 2018082414 A1 | 5/2018 |

OTHER PUBLICATIONS

3GPP, "Generation Partnership Project; Technical Specification Group Radio Access Network; NR; Services provided by the physical layer (Release 15)," 3GPP TS 38.202, V15.1.0, Mar. 2018; pp. 1-13.

Fujitsu, "Discussions on UL data transmission without grant," 3GPP TSG RAN WG1 Meeting #91, R1-1719618, Reno, USA, Nov. 27-Dec. 1, 2017, pp. 1-3.

Huawei et al., "UL data transmission procedure without UL grant," 3GPP TSG RAN WG1 Meeting #91, R1-1719411, Reno, USA, Nov. 27-Dec. 1, 2017, 14 pages.

Nec, "Remaining issues on UL transmission without grant," 3GPP TSG RAN WG1 Meeting #91, R1-1720382, Reno, Nevada, US, Nov. 27-Dec. 1, 2017, pp. 1-5.

NTT Docomo, "Proposal for 7.3.3.4," 3GPP TSG RAN WG1 Meeting #91, R1-1721718, Reno, USA, Nov. 27-Dec. 1, 2017, 5 pages.

Samsung, "Procedure for UL Transmissions," 3GPP TSG RAN WG1 Meeting 91, R1-1720342, Reno, USA, Nov. 27-Dec. 1, 2017, pp. 1-5.

Zte et al. "Remaining details of UL transmission without grant," 3GPP TSG RAN WG1 Meeting 91, R1-1719516, Reno, USA, Nov. 27-Dec. 1, 2017, pp. 1-7.

\* cited by examiner

USER EQUIPMENT AND METHOD FOR GRANT-FREE UPLINK TRANSMISSION

This application claims the benefit of U.S. provisional application Ser. No. 62/674,069, filed May 21, 2018. The disclosure of which is incorporated by reference herein in its entirety.

TECHNICAL FIELD

The technical field relates to a user equipment and a method of grant-free uplink transmission.

BACKGROUND

The fifth generation (referred to as 5G) mobile communication system is one of the current development directions of the wireless communication. The considerations of the 5G system comprises: low latency and high reliability.

The main challenge of the 5G system is how to improve the transmission rate. If the grant uplink transmission of the 4G system is continued to be used in the 5G system, then a large amount of control signaling is needed, and thus is unable to meet the low latency and high reliability required by the 5G system.

Therefore, how to meet the low latency and high reliability required by the 5G system is one of the directions of the industry.

SUMMARY

According to an exemplary embodiment of the disclosure, provided is a method of grant-free uplink transmission for a user equipment. The method includes: receiving a grant-free configuration parameter by the user equipment; receiving at least one reference signal by the user equipment; performing channel measurement based on the at least one reference signal by the user equipment; deciding at least one uplink beamforming weight or at least one precoder based on the at least one reference signal by the user equipment; and performing grant-free uplink transmission based on the decided at least one uplink beamforming weight or the at least one precoder and the grant-free configuration parameter by the user equipment.

According to another exemplary embodiment of the disclosure, provided is a method of grant-free uplink transmission for a user equipment. The method includes: deciding a number of transmission repetitions and/or a resource usage and/or a data quantity per transmission based on a transmission occasion within a transmission period by the user equipment; and performing grant-free uplink transmission based on the number of transmission repetitions and/or the resource usage and/or the data quantity per transmission by the user equipment.

According to another exemplary embodiment of the disclosure, provided is a user equipment. The user equipment comprises: a controller; and a wireless communication module coupled to the controller. The controller is configured to control: receiving a grant-free configuration parameter by the user equipment; receiving at least one reference signal by the user equipment; performing channel measurement based on the at least one reference signal by the user equipment; deciding at least one uplink beamforming weight or at least one precoder based on the at least one reference signal by the user equipment; and performing grant-free uplink transmission based on the decided at least one uplink beamforming weight or the at least one precoder and the grant-free configuration parameter by the user equipment.

According to another exemplary embodiment of the disclosure, provided is a user equipment. The user equipment comprises: a controller; and a wireless communication module coupled to the controller. The controller is configured to control: deciding a number of transmission repetitions and/or a resource usage and/or data quantity per transmission based on a transmission occasion within a transmission period by the user equipment; and performing grant-free uplink transmission based on the number of transmission repetitions and/or the resource usage and/or the data quantity per transmission by the user equipment.

In order to better understand the above and other aspects of the present invention, the accompanying drawings relate to the embodiments are described in the following:

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

A grant-free uplink transmission means that: the base station is pre-configured with uplink related resources, and the user equipment (for example but no limited to smart phones) performs the uplink transmission based on the pre-configured resources of the base station. In this way, the base station does not need to send an additional downlink control signal to the user equipment, so the signaling cost can be reduced.

Exemplary Embodiment 1

Figure 1:
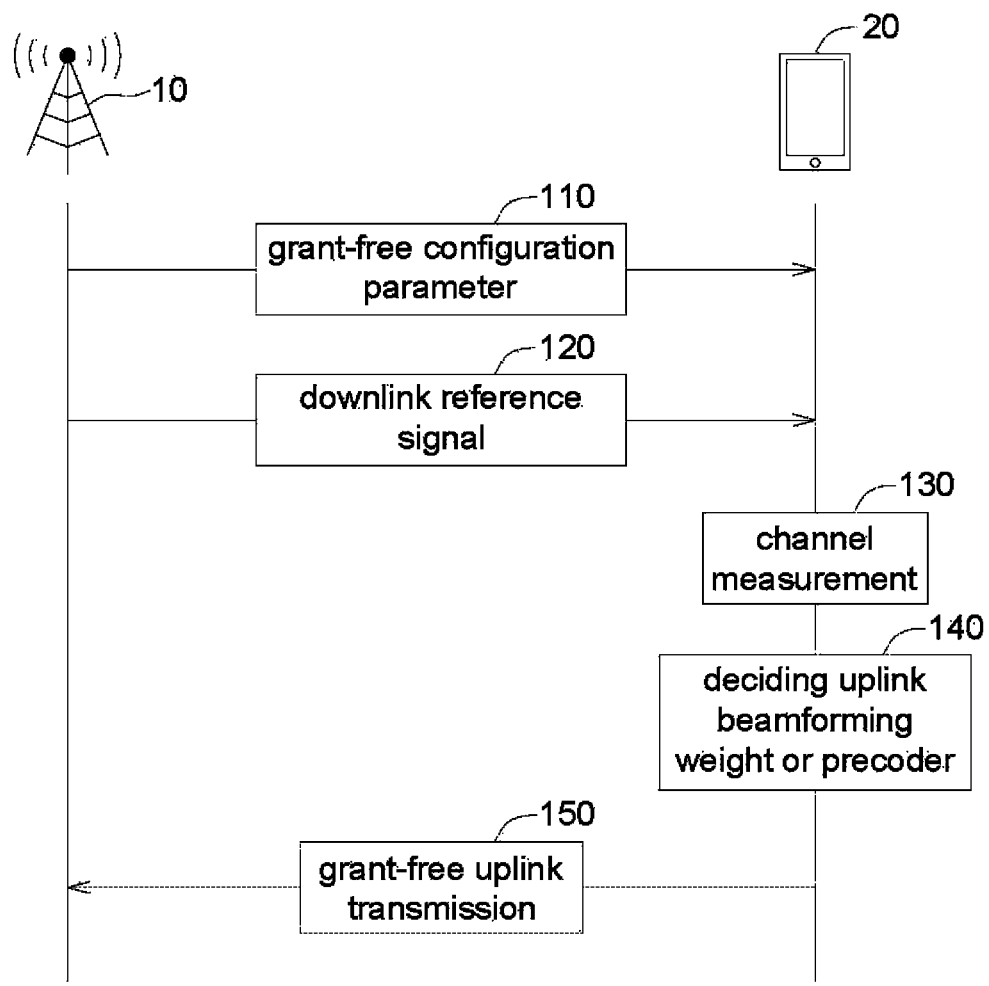
FIG. 1 shows a flow chart of the grant-free uplink transmission according to the exemplary embodiment 1 of this disclosure.

FIG. 1 shows a flow chart of the grant-free uplink transmission according to the exemplary embodiment 1 of this disclosure. As shown in FIG. 1, in step 110, a base station (BS) 10 transmits a grant-free configuration parameter to a user equipment (UE) 20. Herein, the grant-free configuration parameter, for example but not limited to, comprises any combination of the following parameters: the code rate, the modulation order, the transport block size (TBS), the physical resource block size (PRBS), the configured resources, the downlink reference signal (DL RS) related configuration, the uplink reference signal (UL RS) related configuration, the number of rank, etc.

In addition, in exemplary embodiment 1, deciding the code rate, the modulation order, the transport block size, and the physical resource block size can based on any combination of the followings: the first uplink transmission occasion within a transmission period, a number of transmission repetitions within a transmission period, the redundancy version sequence, the repetition pattern and the configured uplink transmission resource.

In step 120, the base station 10 transmits an at least one downlink reference signal to the user equipment 20.

In step 130, the user equipment 20 performs a channel measurement based on the at least one downlink reference signal.

In step 140, the user equipment 20 decides at least one uplink beamforming weight or at least one precoder based on the downlink reference signal. It is possible to use more than two uplink beamforming weights or more than two precoders for each grant-free uplink transmission. The detailed decision of the user equipment 20 on the uplink beamforming weight or the precoder may not be specifically described herein. In addition, in exemplary embodiment 1 of this disclosure, transmission and reception between the base station 10 and the user equipment 20 are in time division duplex (TDD) mode. In TDD mode, the uplink channel and the downlink channel are separated by the time domain. In TDD mode, the uplink channel and the downlink channel uses the same frequency, but the base station transmits signal to the user equipment in a certain time period, and the user equipment transmits signal to the base station in another time period. Therefore, TDD mode has a channel reciprocity (it means that the uplink channel and the downlink channel have a corresponding relationship, that is, the downlink channel state can reflect the uplink channel state). Thus, the user equipment 20 can decide the uplink beamforming weight or the precoder.

In step 150, the user equipment 20 performs the grant-free uplink transmission based on the decided at least one uplink beamforming weight or the at least one precoder, and the grant-free configuration parameter.

As above, in exemplary embodiment 1 of this disclosure, the uplink beamforming weight or the precoder are decided by the user equipment rather than by the base station. Therefore, in exemplary embodiment 1 of this disclosure, the signaling cost and latency can be further reduced, and thus the efficiency can be increased.

Exemplary Embodiment 2

Figure 2:
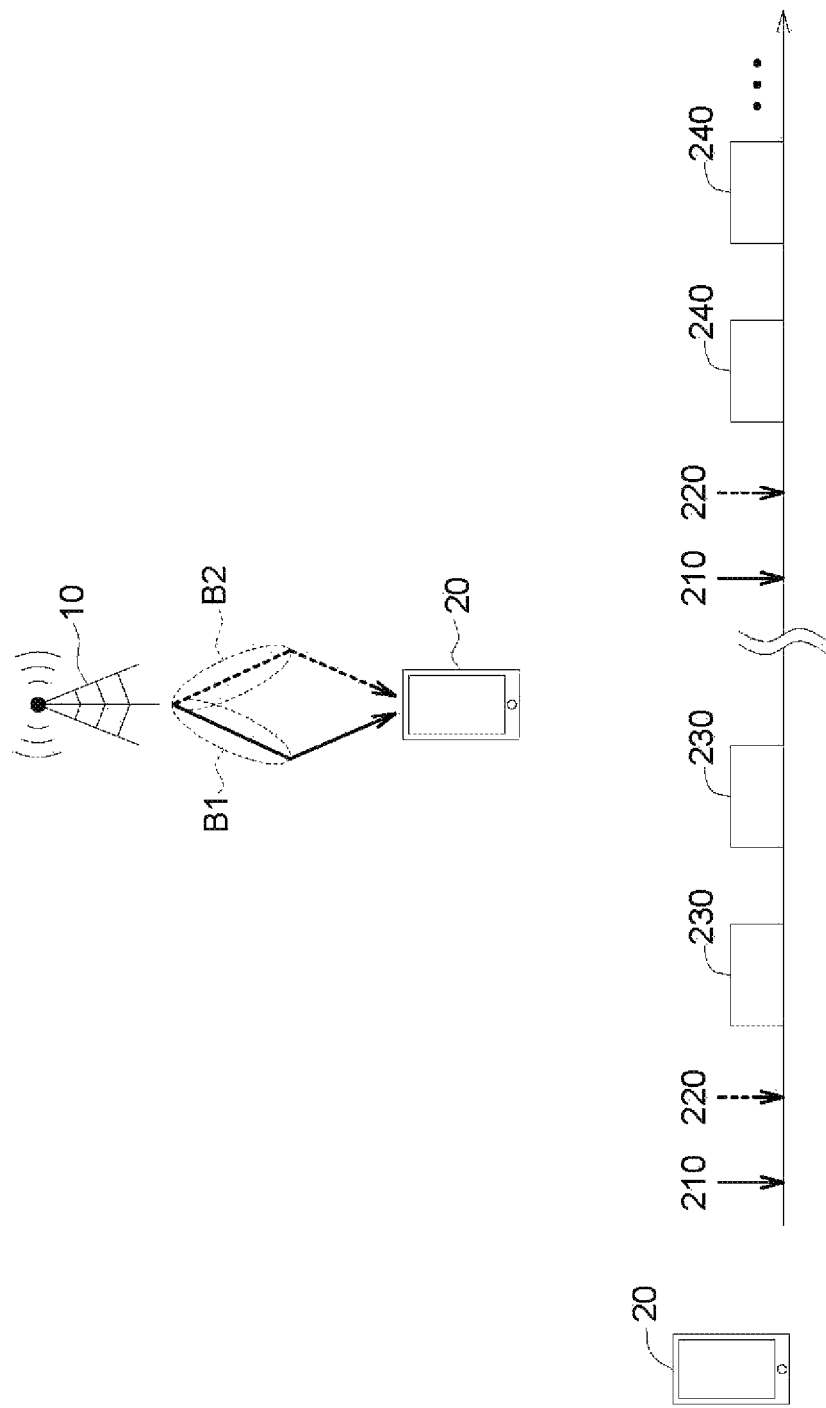
FIG. 2 shows a schematic diagram according to the exemplary embodiment 2 of this disclosure.

Now referring to FIG. 2, it shows a schematic diagram according to the exemplary embodiment 2 of this disclosure. As shown in FIG. 2, the base station 10 has a plurality of beams, and herein two beams B1 and B2 are taken as an example for description, but not to limit this disclosure.

The base station 10 periodically transmits two downlink reference signals 210 and 220, respectively, to the user equipment 20 through the beams B1 and B2. In addition, the base station 10 pre-configures the resources 230 and 240 to the user equipment 20, wherein the resources 230 and 240 are related to beams B1 and B2, respectively.

After the user equipment 20 receives the downlink reference signals 210 and 220, the user equipment 20 can perform channel measurement to decide which channel currently has a better channel quality among the two channels corresponding to the downlink reference signals 210 and 220, respectively. Herein, assuming that the channel corresponding to the downlink reference signal 210 has a better channel quality, the user equipment 20 can perform the grant-free uplink transmission through the resource 230.

Assuming that after this, due to the change of the channel state, the channel corresponding to the downlink reference signal 220 has a better channel quality, the user equipment 20 can perform the grant-free uplink transmission through the resource 240.

Exemplary Embodiment 2-1

Figure 3:
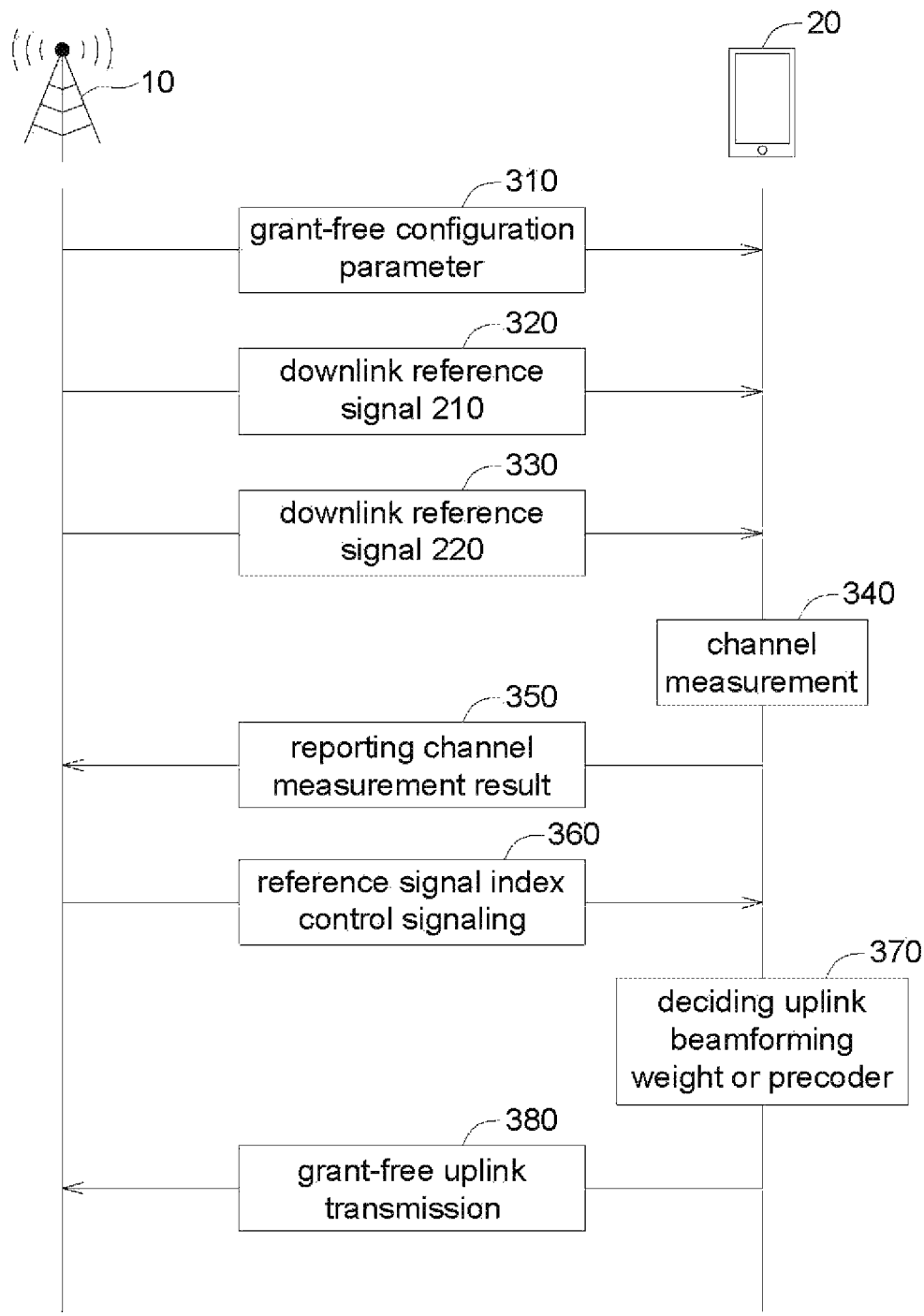
FIG. 3 shows a flow chart of the grant-free uplink transmission according to the exemplary embodiment 2-1 of this disclosure.

FIG. 3 shows a flow chart of the grant-free uplink transmission according to the exemplary embodiment 2-1 of this disclosure. As shown in FIG. 3, in step 310, the base station 10 transmits the grant-free configuration parameter to the user equipment 20.

In step 320, the base station 10 transmits the downlink reference signal 210 to the user equipment 20 through the beam B1.

In step 330, the base station 10 transmits the downlink reference signal 220 to the user equipment 20 through the beam B2. The beams B1 and B2 correspond to respective one of a plurality of uplink transmission resources assigned to the user equipment.

In step 340, the user equipment 20 performs a channel measurement based on the received downlink reference signals 210 and 220.

In step 350, the user equipment 20 reports a channel measurement result to the base station 10.

In step 360, the base station 10 transmits a reference signal index control signaling to the user equipment 20 based on the channel measurement result reported by the user equipment 20. That is, the base station 10 indicates the user equipment 20 about which channel has a better channel quality among the two channels corresponding to the downlink reference signals 210 and 220, respectively. The reference signal index control signaling comprises a reference signal index, and the reference signal index is related to the reference signal. It should be noted that the reference signal index control signaling may comprise one or more reference signal index, and the reference signal index can be an identifier of the downlink reference signal or an encoded code of the downlink reference signal.

In step 370, the user equipment 20 receives the reference signal index control signaling responding to the reported channel measurement result, and the user equipment 20 decides an uplink beamforming weight or a precoder based on the downlink reference signal assigned by the reference signal index control signaling, and the user equipment 20 chooses one among the resources 230 or 240 based on the resource corresponding to the reference signal indicated by the reference signal index control signaling to use for the grant-free uplink transmission. In other words, the user equipment 20 receives the reference signal index control signaling from the base station 10 after reporting the channel measurement result, and then decides the uplink beamforming weight or the precoder.

In step 380, the user equipment 20 performs the grant-free uplink transmission through the resources 230 or 240 (assigned by the reference signal index control signaling).

Exemplary Embodiment 2-2

Figure 4:
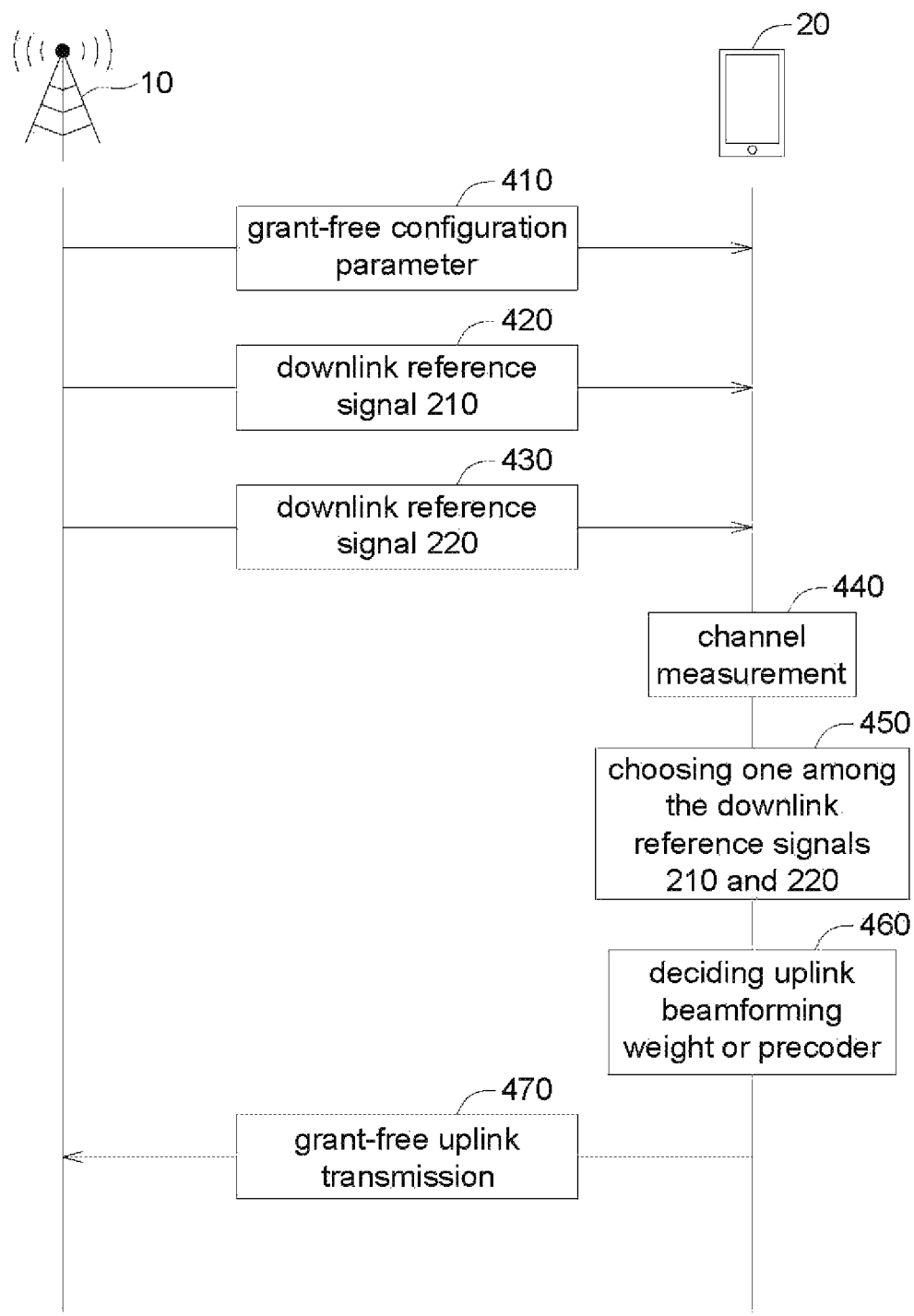
FIG. 4 shows a flow chart of the grant-free uplink transmission according to the exemplary embodiment 2-2 of this disclosure.

FIG. 4 shows a flow chart of the grant-free uplink transmission according to the exemplary embodiment 2-2 of this disclosure. As shown in FIG. 4, in step 410, the base station 10 transmits the grant-free configuration parameter to the user equipment 20.

In step 420, the base station 10 transmits the downlink reference signal 210 to the user equipment 20 through the beam B1.

In step 430, the base station 10 transmits the downlink reference signal 220 to the user equipment 20 through the beam B2.

In step 440, the user equipment 20 performs a channel measurement based on the received downlink reference signals 210 and 220.

In step 450, the user equipment 20 decides to choose one among the downlink reference signals 210 and 220 based on the channel measurement signal (i.e., the user equipment 20 decides which channel has a better channel quality based on the channel measurement result), that is, in this embodiment, the user equipment 20 do not have to report channel measurement result to the base station 10.

In step 460, the user equipment 20 decides an uplink beamforming weight or a precoder based on the chosen downlink reference signal.

In step 470, the user equipment 20 performs the grant-free uplink transmission based on the chosen downlink reference signals 210 or 220 and through the resources 230 or 240 (related to the chosen downlink reference signal).

The exemplary embodiment 2-1 and the exemplary embodiment 2-2 are the sub-embodiments of the exemplary embodiment 2. The exemplary embodiment 2, the exemplary embodiment 2-1, and the exemplary embodiment 2-2 of this disclosure can be implemented together with the exemplary embodiment 1 of this disclosure.

As stated above, in exemplary embodiment 2, the exemplary embodiment 2-1, and the exemplary embodiment 2-2 of this disclosure, because of choosing the better resource among the configured multiple resources based on the reference signal quality (i.e., channel quality) to perform the grant-free uplink transmission, the transmission reliability can be increased.

Exemplary Embodiment 3

In exemplary embodiment 3 of this disclosure, to increase the transmission efficiency, when performing the grant-free uplink transmission, the base station 10 and/or the user equipment 20 can decide the code rate based on the number of transmission repetitions within a transmission period, the details will be described as following. Or to say, in exemplary embodiment 3 of this disclosure, deciding the number of transmission repetitions and/or a resource usage and/or a data quantity per transmission by the transmission occasion within the transmission period (for example but not limited to the uplink data ready time within the transmission period). In one embodiment the data quantity per transmission is a constant value, and in one embodiment the resource usage is a constant value. The details will be described as following.

Figure 5:
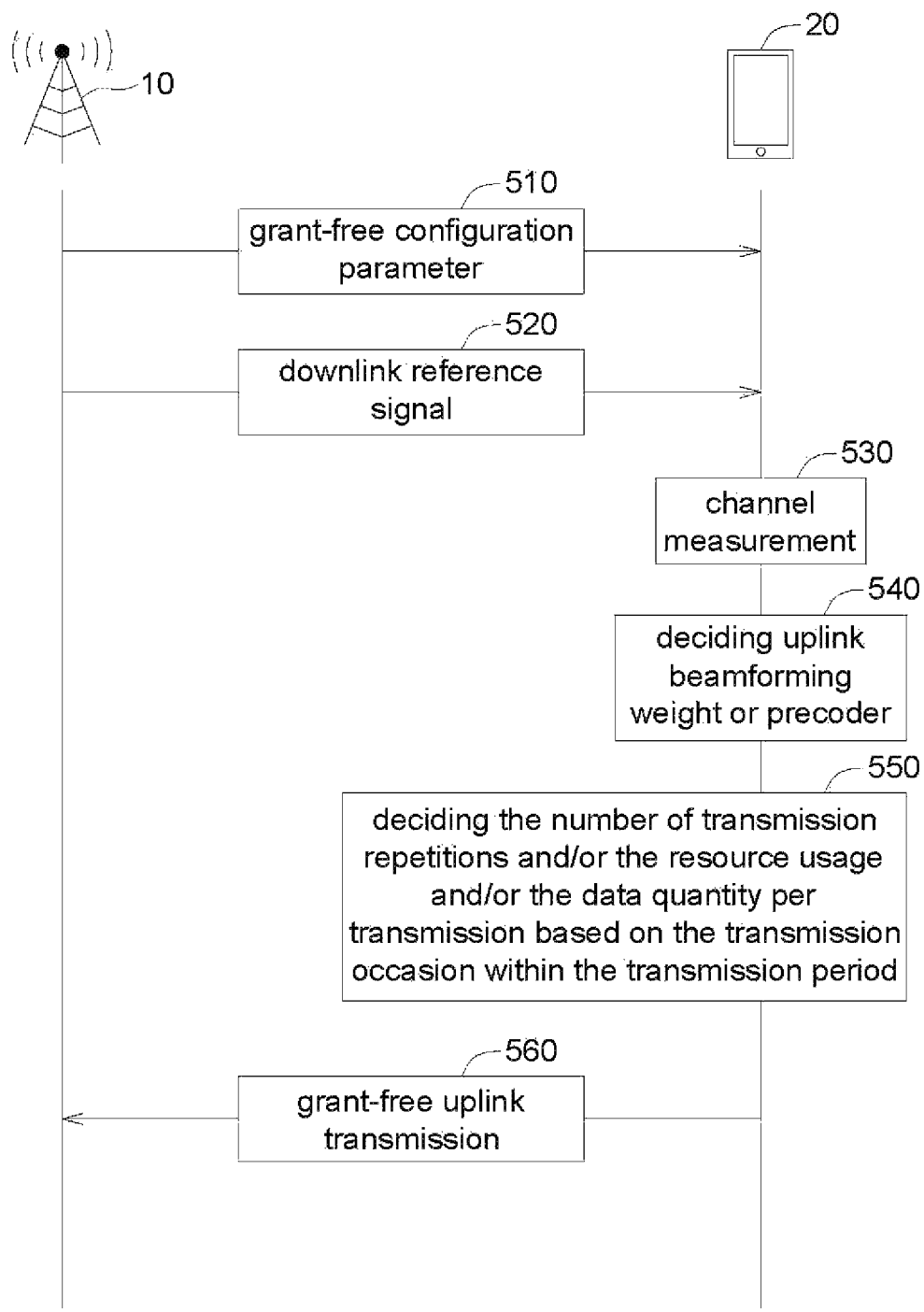
FIG. 5 shows a flow chart of the grant-free uplink transmission according to the exemplary embodiment 3 of this disclosure.

FIG. 5 shows a flow chart of the grant-free uplink transmission according to the exemplary embodiment 3 of this disclosure. As shown in FIG. 5, in step 510, the base station 10 transmits the grant-free configuration parameter to the user equipment 20.

In step 520, the base station 10 transmits a downlink reference signal to the user equipment 20.

In step 530, the user equipment 20 performs a channel measurement based on the downlink reference signal.

In step 540, the user equipment 20 decides an uplink beamforming weight or a precoder based on the downlink reference signal.

In step 550, the user equipment 20 decides the number of transmission repetitions and/or the resource usage and/or the data quantity per transmission based on the transmission occasion within the transmission period. In one embodiment the data quantity per transmission is a constant value, and in one embodiment the resource usage is a constant value.

In step 560, the user equipment 20 performs the grant-free uplink transmission.

Exemplary embodiment 3-1A: elastic physical resource block size (PRBS), fixed transport block size (TBS)

Figure 6:
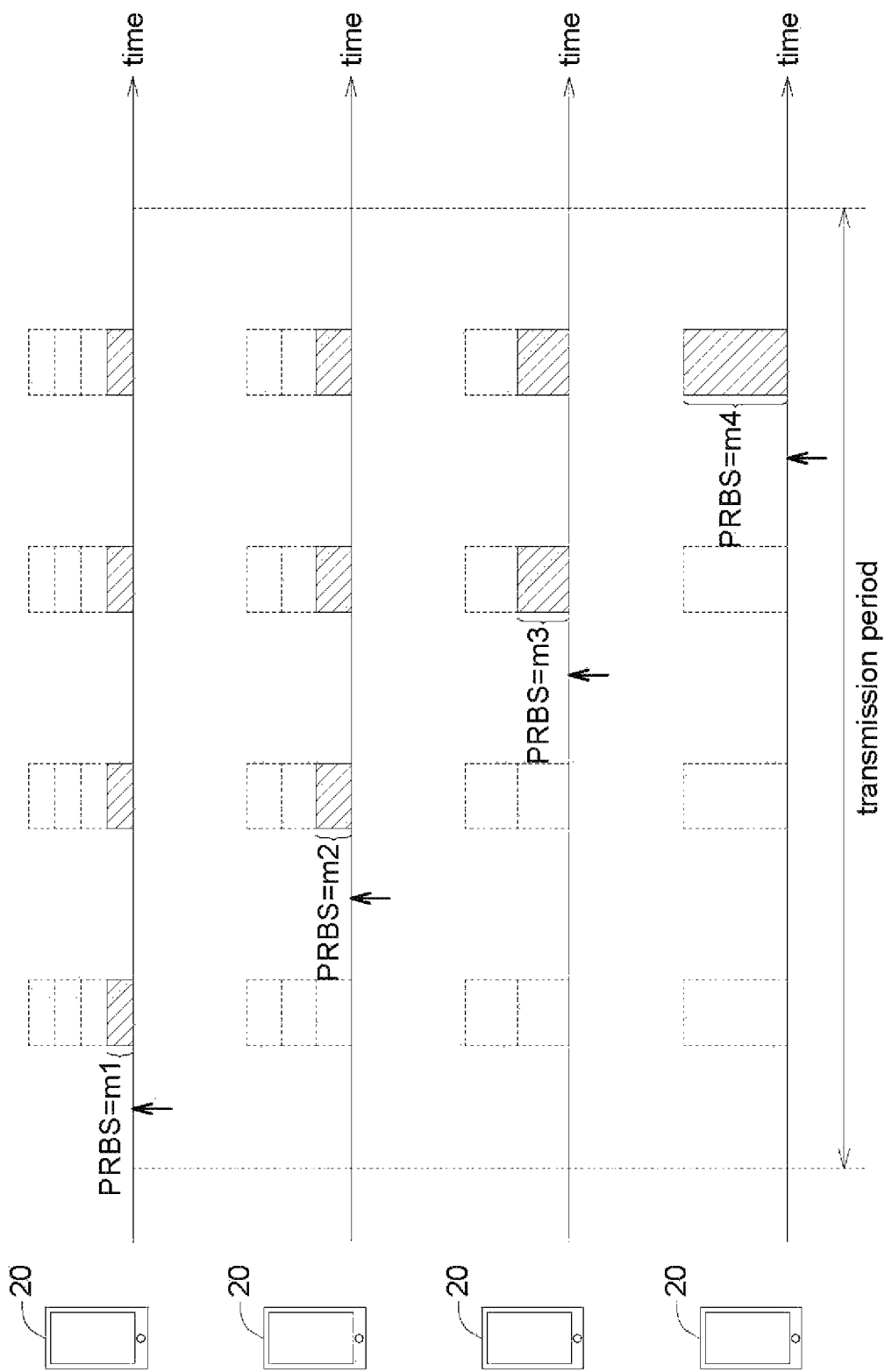
FIG. 6 shows a schematic diagram according to the exemplary embodiment 3-1A of this disclosure.

In exemplary embodiment 3-1A of this disclosure, the user equipment 20 can decide PRBS based on the number of transmission repetitions within a transmission period (but TBS is fixed). Now referring to FIG. 6, it shows a schematic diagram according to the exemplary embodiment 3-1A of this disclosure. As shown in FIG. 6, assume that within the transmission period, the upper limit of the number of transmission repetitions is 4, and the redundancy version (RV) sequence={0,0,0,0}. Assume that the original data is 100 bits, and after the coding, the data is coded to 300 bits (for example but not limited to copying 3 or other copies of the original data). RV=0 represents that the 1st bit to the 200th bit are transmitted; RV=1 represents that the 26th bit to the 225th bit are transmitted; RV=2 represents that the 51th bit to the 250th bit are transmitted; RV=3 represents that the 76th bit to the 275th bit are transmitted; and RV=4 represents that the 101th bit to the 300th bit are transmitted.

If the uplink data of the user equipment 20 is ready before the first transmission occasion (in FIG. 6, the upward arrow represents that the uplink data is ready), then there can be 4 transmission repetitions within the transmission period. In each transmission repetition, the user equipment 20 performs transmission with an uplink transmission of PRBS=m1 (m1 for example is 3), and the same amount of data is transmitted each time (i.e., TBS is fixed).

Similarly, if the uplink data of the user equipment 20 is ready before the second transmission occasion, then there can be 3 transmission repetitions within the transmission period. In each transmission repetition, the user equipment 20 performs transmission with an uplink transmission of PRBS=m2 (m2 for example is 4), and the same amount of data is transmitted each time (i.e., TBS is fixed).

Similarly, if the uplink data of the user equipment 20 is ready before the third transmission occasion, then there can be 2 transmission repetitions within the transmission period. In each transmission repetition, the user equipment 20 performs transmission with an uplink transmission of PRBS=m3 (m3 for example is 6), and the same amount of data is transmitted each time (i.e., TBS is fixed).

Similarly, if the uplink data of the user equipment 20 is ready before the fourth (i.e., the last) transmission occasion, then there can be 1 transmission repetition within the transmission period. In each transmission repetition, the user equipment 20 performs transmission with an uplink transmission of PRBS=m4 (m4 for example is 12), and the same amount of data is transmitted each time (i.e., TBS is fixed). In the above description, m1≤m2≤m3≤m4.

That is, in exemplary embodiment 3-1A of this disclosure, within a transmission period, if there are more transmission repetitions, then fewer resource is used for transmission per transmission repetition (i.e., PRBS is smaller, but TBS is fixed). In contrast, within a transmission period, if there are fewer transmission repetitions, then more resources are used to transmit per transmission repetition (i.e., PRBS is higher, but TBS is fixed). Therefore, the transmission efficiency can be effectively increased.

Exemplary embodiment 3-1B: elastic physical resource block size (PRBS), fixed transport block size (TBS)

Figure 7:
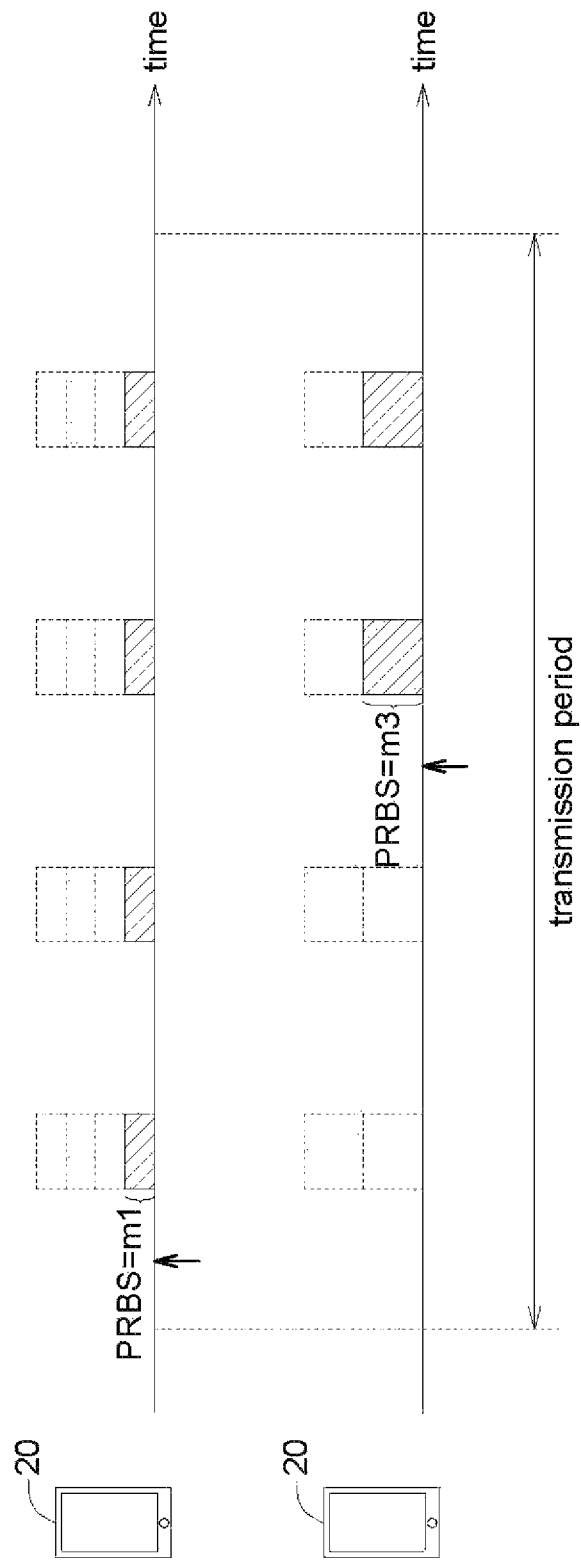
FIG. 7 shows a schematic diagram according to the exemplary embodiment 3-1B of this disclosure.

In exemplary embodiment 3-1 B of this disclosure, PRBS is decided based on the transmission occasion within a transmission period (but TBS is fixed). FIG. 7 shows a schematic diagram according to the exemplary embodiment 3-1 B of this disclosure. The situation in FIG. 7 is similar to FIG. 6, and the difference is that in FIG. 7, the redundancy version sequence={0,3,0,3}.

If the uplink data of the user equipment 20 is ready before the first transmission occasion, then there can be 4 transmission repetitions within the transmission period. In each transmission repetition, the user equipment 20 performs transmission with an uplink transmission of PRBS=m1 (m1 for example is 3), and the same amount of data is transmitted each time (i.e., TBS is fixed).

Similarly, if the uplink data of the user equipment 20 is ready before the third transmission occasion, then there can be 2 transmission repetitions within the transmission period. In each transmission repetition, the user equipment 20 performs transmission with an uplink transmission of PRBS=m3 (m3 for example is 6), and the same amount of data is transmitted each time (i.e., TBS is fixed).

That is, in exemplary embodiment 3-1B of this disclosure, within a transmission period, if there are more transmission repetitions, then fewer resource is used to transmit per transmission repetition (i.e., PRBS is smaller, but TBS is fixed). In contrast, within a transmission period, if there are fewer transmission repetitions, then more resources are used to transmit per transmission repetition (i.e., PRBS is higher, but TBS is fixed). Therefore, the transmission efficiency can be effectively increased.

Exemplary embodiment 3-1C: elastic transport block size (TBS), fixed physical resource block size (PRBS)

Figure 8:
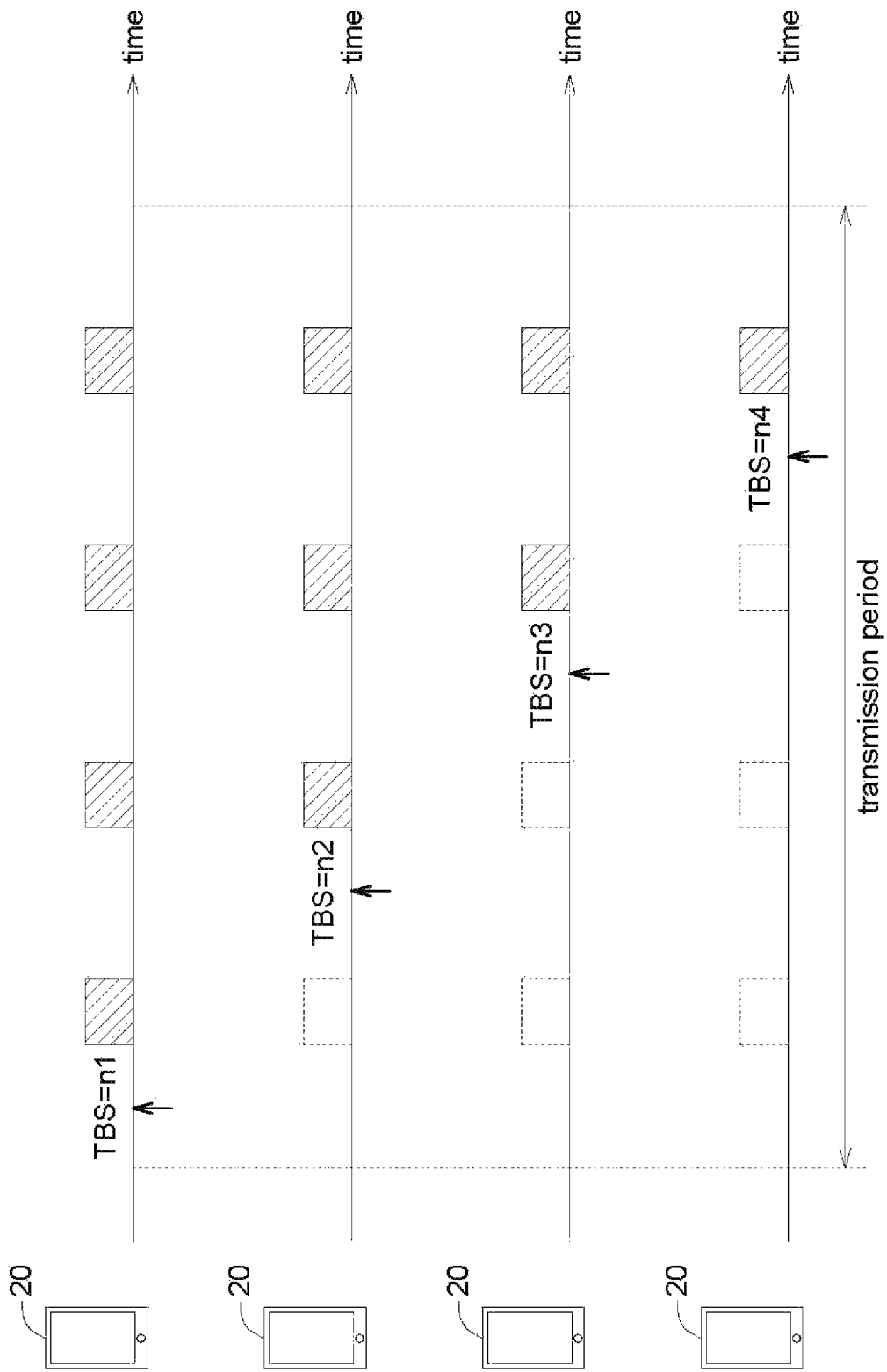
FIG. 8 shows a schematic diagram according to the exemplary embodiment 3-1C of this disclosure.

In exemplary embodiment 3-1C of this disclosure, the transmission data quantity TBS can be decided based on the transmission occasion within a transmission period (but the resource usage PRBS used each time is fixed). Now referring to FIG. 8, it shows a schematic diagram according to the exemplary embodiment 3-1C of this disclosure. As shown in FIG. 8, assuming that the redundancy version sequence={0, 0,0,0}. If the uplink data of the user equipment 20 is ready before the first transmission occasion, then there can be 4 transmission repetitions within the transmission period. In each transmission repetition, the user equipment 20 performs transmission with transmission data quantity TBS=n1 (n1 for example is 120 bits), and the same amount of resource is used for transmission each time (i.e., PRBS is fixed, for example, using all of the resources).

Similarly, if the uplink data of the user equipment 20 is ready before the second transmission occasion, then there can be 3 transmission repetitions within the transmission period. In each transmission repetition, the user equipment 20 performs transmission with transmission data quantity TBS=n2 (n2 for example is 90 bits), and the same amount of resource is used for transmission each time (i.e., PRBS is fixed, for example, using all of the resources).

Similarly, if the uplink data of the user equipment 20 is ready before the third transmission occasion, then there can be 2 transmission repetitions within the transmission period. In each transmission repetition, the user equipment 20 performs transmission with transmission data quantity TBS=n3 (n3 for example is 60 bits), and the same amount of resource is used for transmission each time (i.e., PRBS is fixed, for example, using all of the resources).

Similarly, if the uplink data of the user equipment 20 is ready before the fourth (i.e., the last) transmission occasion, then there can be 1 transmission repetition within the transmission period. In each transmission repetition, the user equipment 20 performs transmission with transmission data quantity TBS=n4 (n4 for example is 30 bits), and the same amount of resource is used for transmission each time (i.e., PRBS is fixed, for example, using all of the resources). In the above description, n1≥n2≥n3≥n4.

That is, in exemplary embodiment 3-1C of this disclosure, within a transmission period, if there are more transmission repetitions, then the data quantity transmitted each time is more, but the same amount of resource is used for transmission per transmission repetition (i.e., TBS is bigger, but PRBS is fixed). In contrast, within a transmission period, if there are fewer transmission repetitions, then the data quantity transmitted each time is fewer, but the same amount of resource is used for transmission per transmission repetition (i.e., TBS is smaller, but PRBS is fixed). Therefore, the transmission efficiency can be effectively increased Exemplary embodiment 3-1D: elastic physical resource block size (PRBS) and/or fixed transport block size (TBS)

Figure 9:
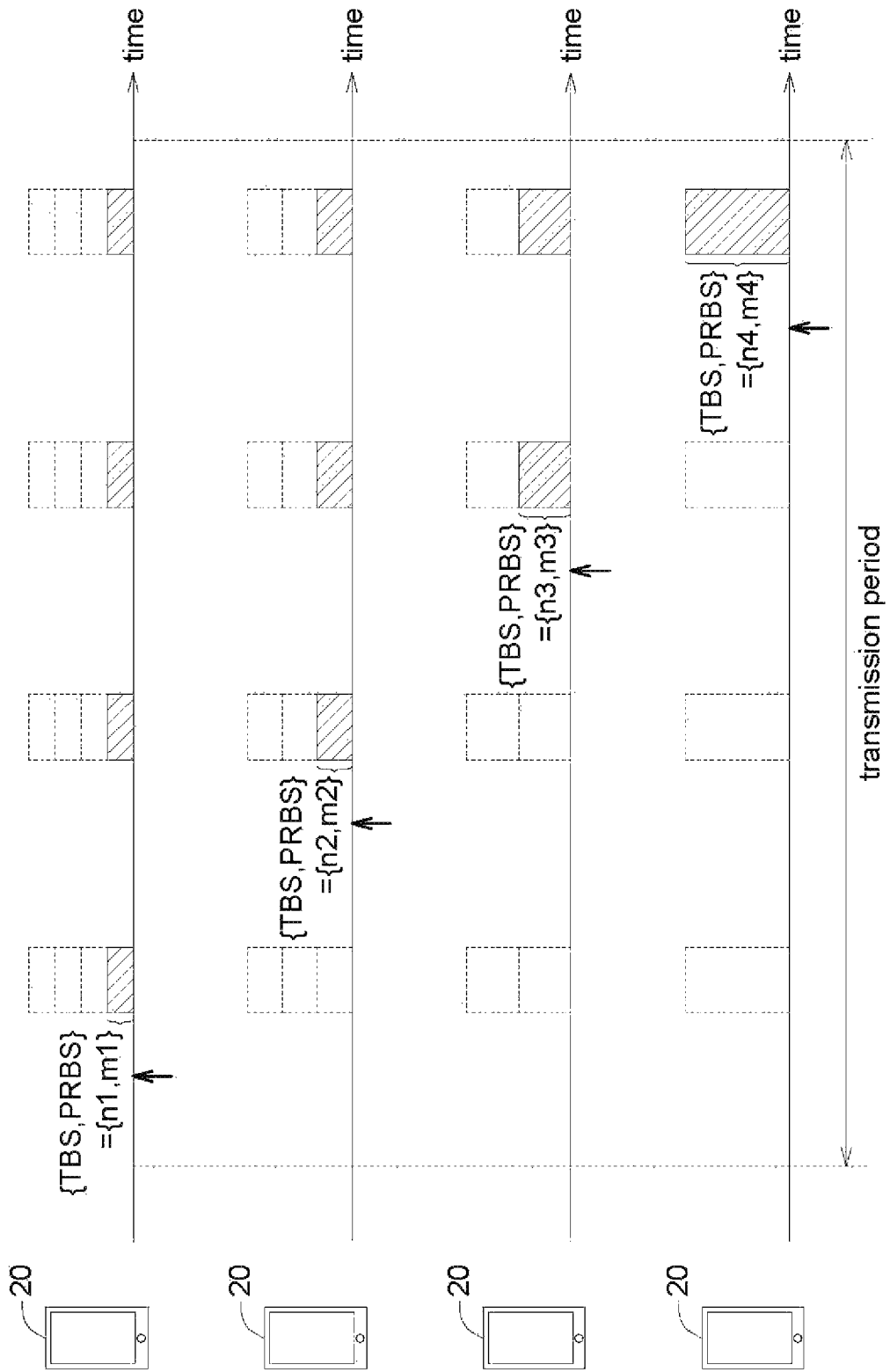
FIG. 9 shows a schematic diagram according to the exemplary embodiment 3-1D of this disclosure.

In exemplary embodiment 3-1D of this disclosure, PRBS and/or TBS are decided based on the transmission occasion within a transmission period. Now referring to FIG. 9, it shows a schematic diagram according to the exemplary embodiment 3-1D of this disclosure. As shown in FIG. 9, assuming that the redundancy version sequence={0,0,0,0}. If the uplink data of the user equipment 20 is ready before the first transmission occasion, then there can be 4 transmission repetitions within the transmission period. In each transmission repetition, the user equipment 20 performs transmission with {TBS, PRBS}={n1, m1}.

Similarly, if the uplink data of the user equipment 20 is ready before the second transmission occasion, then there can be 3 transmission repetitions within the transmission period. In each transmission repetition, the user equipment 20 performs transmission with {TBS, PRBS}={n2, m2}.

Similarly, if the uplink data of the user equipment 20 is ready before the third transmission occasion, then there can be 2 transmission repetitions within the transmission period. In each transmission repetition, the user equipment 20 performs transmission with {TBS, PRBS}={n3, m3}.

Similarly, if the uplink data of the user equipment 20 is ready before the fourth (i.e., the last) transmission occasion, then there can be 1 transmission repetition within the transmission period. In each transmission repetition, the user equipment 20 performs transmission with {TBS, PRBS}={n4, m4}. In the above description, n1≥n2≥n3≥n4 and m1≤m2≤m3≤m4.

That is, in exemplary embodiment 3-1D of this disclosure, within a transmission period, the data quantity transmitted each time and/or the resources used each time are decided based on the number of transmission repetitions. Therefore, the transmission efficiency can be effectively increased.

In exemplary embodiment 3-1A to exemplary embodiment 3-1D, the base station 10 can further detect the start of the initial uplink transmission based on the energy detection result and/or the different start transmission with different demodulation reference signal (DMRS). In addition, if the initial uplink transmission failed, the user equipment 20 can perform re-transmission based on the ACK/NACK signal returned by the base station 10.

Exemplary Embodiment 3-2A

Figure 10:
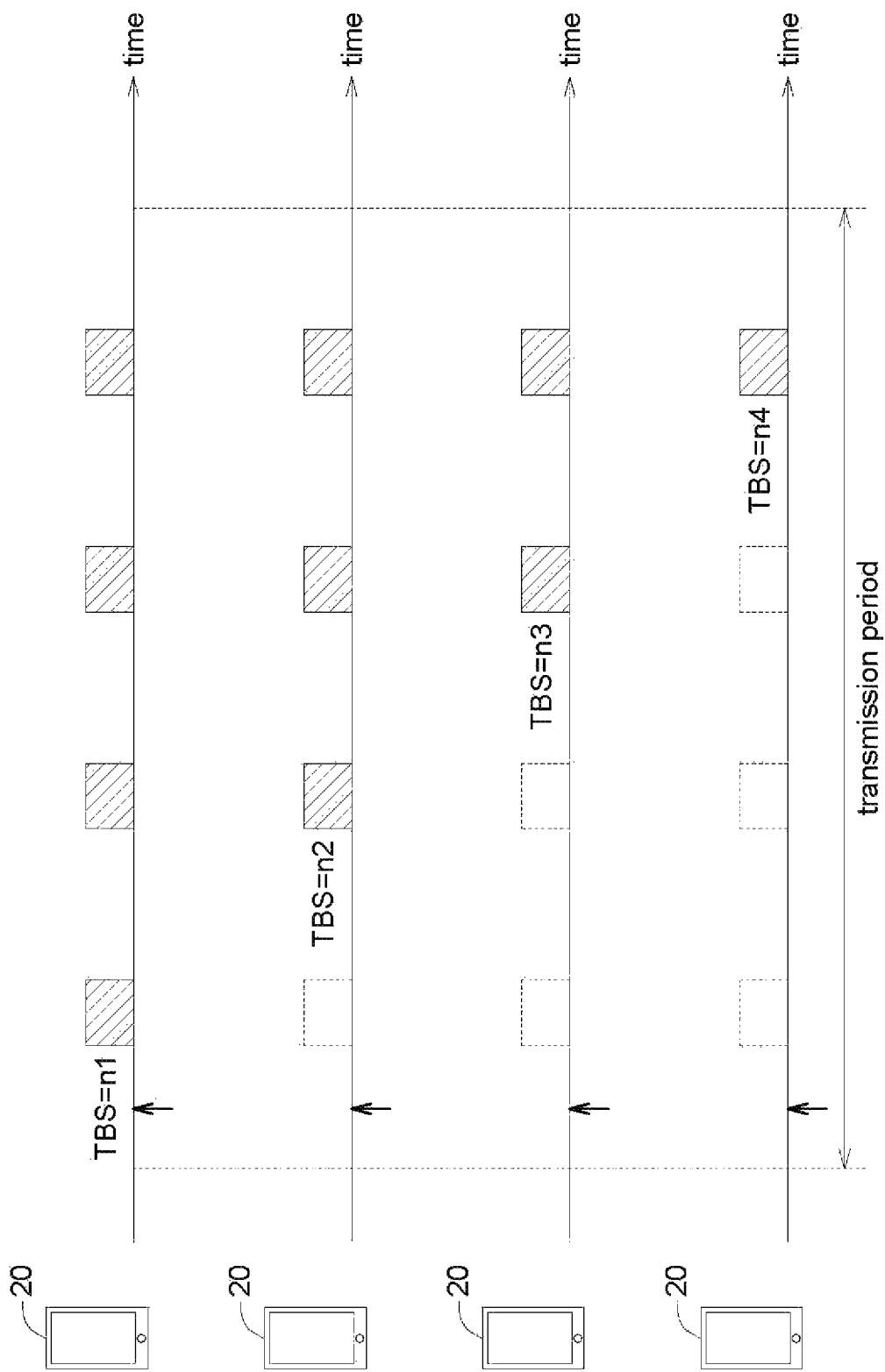
FIG. 10 shows a schematic diagram according to the exemplary embodiment 3-2A of this disclosure.

In exemplary embodiment 3-2A of this disclosure, the number of transmission repetitions within a transmission period is decided based on the data quantity to be transmitted (herein refers to the data quantity before coding) which is ready by the user equipment. Now referring to FIG. 10, it shows a schematic diagram according to the exemplary embodiment 3-2A of this disclosure. As shown in FIG. 10, assuming that the redundancy version sequence={0,0,0,0}. At below, as an example for description, the uplink data of the user equipment 20 is ready before the first transmission occasion. If the data quantity to be transmitted is bigger, then the transmission repetitions will be performed more times within the transmission period. If the data quantity to be transmitted is smaller, then the transmission repetitions will be performed fewer times within the transmission period.

In FIG. 10, from top to bottom, the data to be transmitted of the user equipment 20 decreases from the maximum to the minimum, and within the transmission period, the number of transmission repetitions is 4, 3, 2, and 1, respectively. In each transmission occasion repetition, the user equipment 20 performs transmission with TBS=n1, TBS=n2, TBS=n3, and TBS=n4, and n1≥n2≥n3≥n4. Therefore, the transmission efficiency can be effectively increased.

Exemplary Embodiment 3-2B

Figure 11:
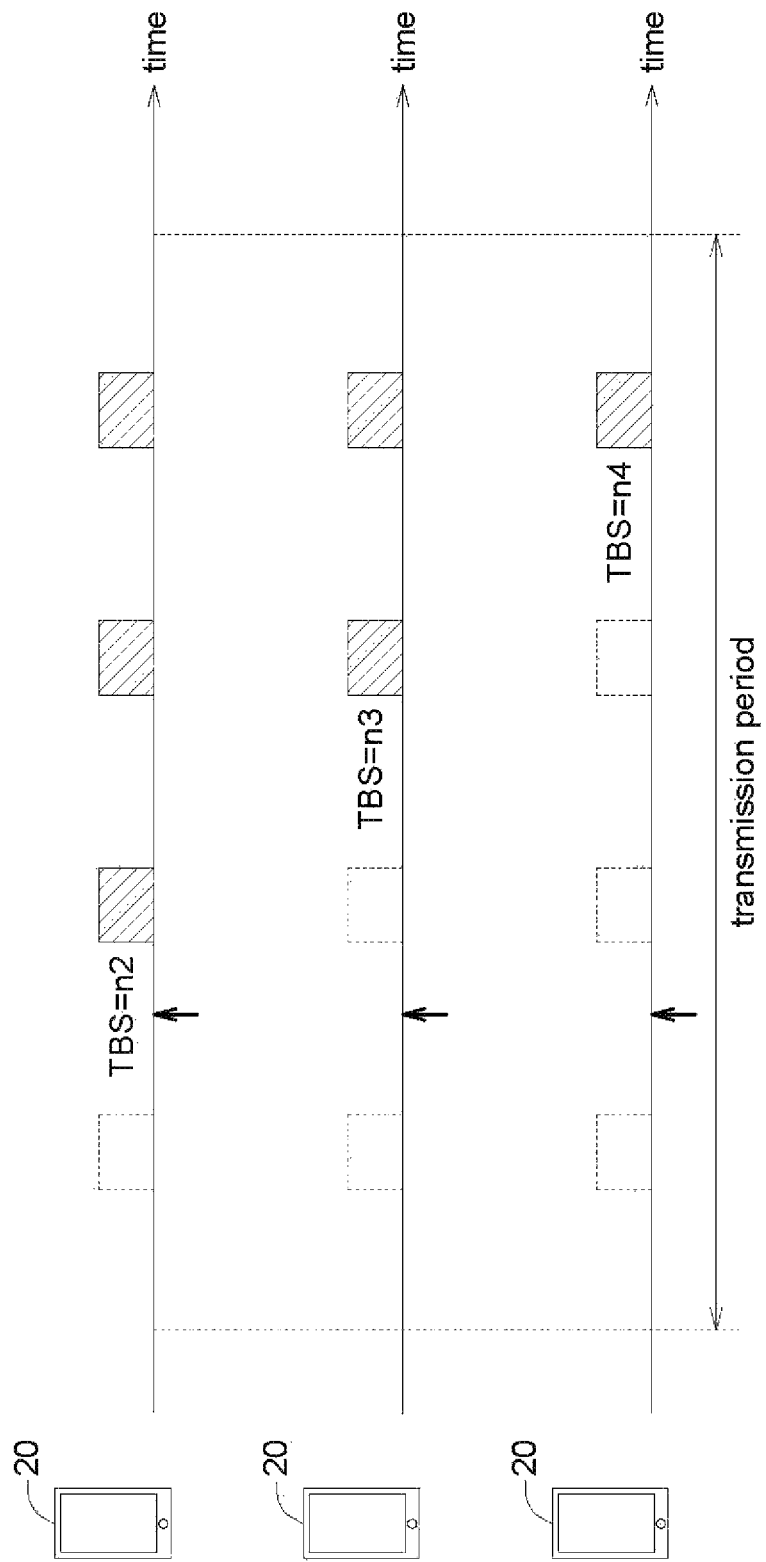
FIG. 11 shows a schematic diagram according to the exemplary embodiment 3-2B of this disclosure.

In exemplary embodiment 3-2B of this disclosure, the number of transmission repetitions within a transmission period is decided based on the data quantity to be transmitted (herein refers to the data quantity before coding) which is ready by the user equipment and/or the initial time of the first uplink transmission within a transmission period. Now referring to FIG. 11, it shows a schematic diagram according to the exemplary embodiment 3-2B of this disclosure. As shown in FIG. 11, assuming that the redundancy version sequence={0,0,0,0}. At below, as an example for description, the uplink data of the user equipment 20 is ready before the second transmission occasion.

If the data quantity to be transmitted is bigger, then the transmission repetitions will be performed more times within the transmission period. If the data quantity to be transmitted is smaller, then the transmission repetitions will be performed fewer times within the transmission period.

In FIG. 11, from top to bottom, the data to be transmitted of the user equipment 20 decreases from the maximum to the minimum, and within the transmission period, the number of transmission repetitions is 3, 2, and 1, respectively. In each transmission occasion repetition, the user equipment 20 performs transmission with TBS=n2, TBS=n3, and TBS=n4, and n2≥n3≥n4. Therefore, the transmission efficiency can be effectively increased.

In exemplary embodiment 3-2A and exemplary embodiment 3-2B, the user equipment 20 can decide the number of transmission repetitions within a transmission period based on the uplink transmission data quantity.

Exemplary Embodiment 3-3

Figure 12:
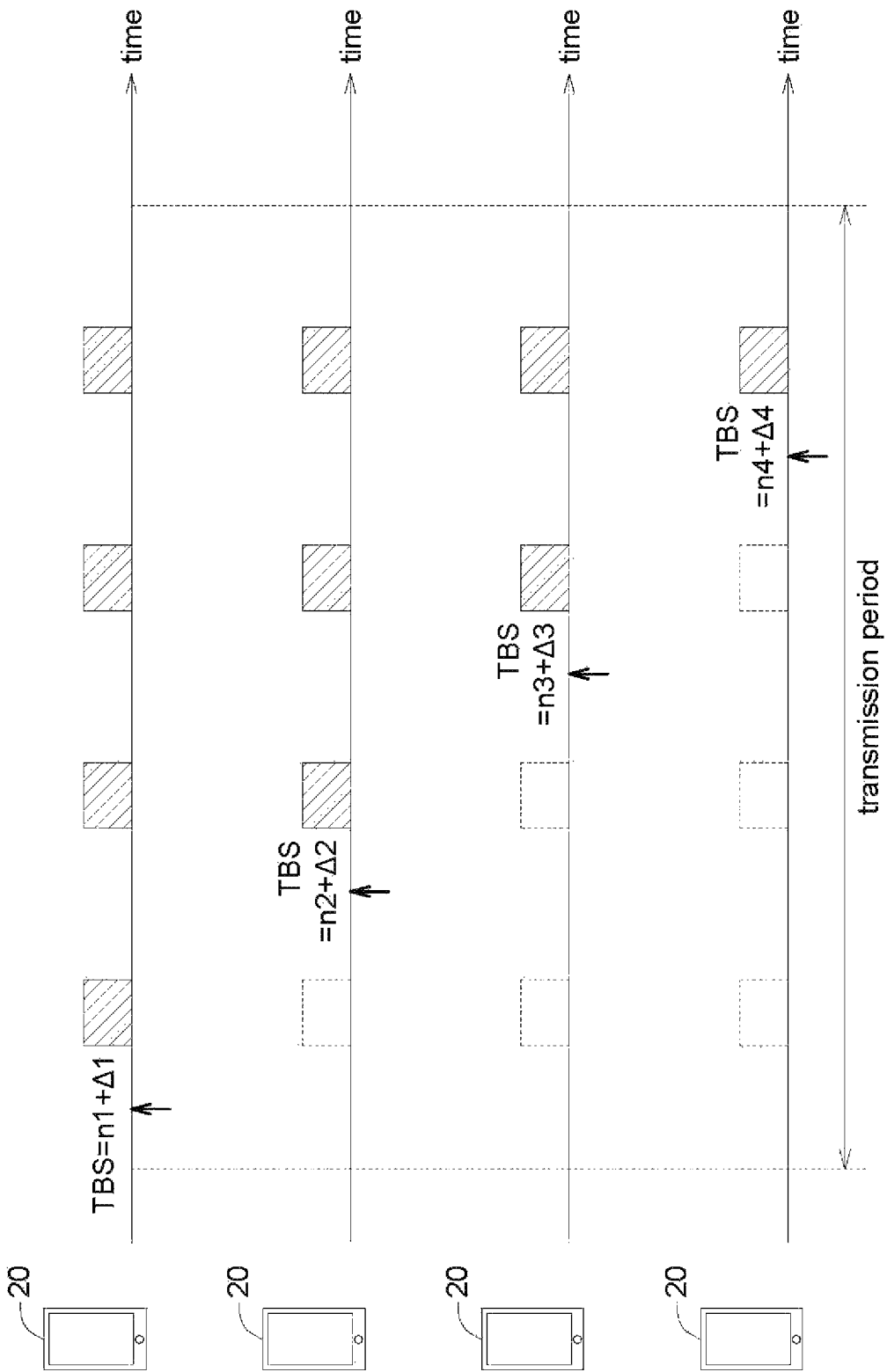
FIG. 12 shows a schematic diagram according to the exemplary embodiment 3-3 of this disclosure.

In exemplary embodiment 3-3 of this disclosure, the user equipment can decide the data quantity of each transmission (i.e., dynamically decide TBS) based on the measurement result of the reference signal (or based on the (downlink) channel quality). Wherein deciding new TBS can be performed after the user equipment 20 decides the beamforming weight or the precoder, and after deciding new TBS, the user equipment 20 will starts to perform the grant-free uplink transmission. Now referring to FIG. 12, it shows a schematic diagram according to the exemplary embodiment 3-3 of this disclosure. As shown in FIG. 12, assuming that the redundancy version sequence={0,0,0,0}.

If the uplink data of the user equipment 20 is ready before the first transmission occasion, then there can be 4 transmission repetitions within the transmission period. In each transmission occasion repetition, the user equipment 20 decides the transmission data quantity TBS=n1+Δ1 (n1 for example is 120 bits, and Δ1 for example is 20 bits) based on the measurement result of the reference signal (or based on the (downlink) channel quality) to perform transmission, and the resources used in each transmission may be fixed or elastic (i.e., PRBS is fixed or elastic).

If the uplink data of the user equipment 20 is ready before the second transmission occasion, then there can be 3 transmission repetitions within the transmission period. In each transmission occasion repetition, the user equipment 20 decides the transmission data quantity TBS=n2+Δ2 (n2 for example is 90 bits, and Δ2 for example is 15 bits) based on the measurement result of the reference signal (or based on the (downlink) channel quality) to perform transmission, and the resources used in each transmission may be fixed or elastic (i.e., PRBS is fixed or elastic).

If the uplink data of the user equipment 20 is ready before the third transmission occasion, then there can be 2 transmission repetitions within the transmission period. In each transmission occasion repetition, the user equipment 20 decides the transmission data quantity TBS=n3+Δ3 (n3 for example is 60 bits, and Δ3 for example is 10 bits) based on the measurement result of the reference signal (or based on the (downlink) channel quality) to perform transmission, and the resources used in each transmission may be fixed or elastic (i.e., PRBS is fixed or elastic).

If the uplink data of the user equipment 20 is ready before the fourth transmission occasion, then there can be 1 transmission repetition within the transmission period. In each transmission occasion repetition, the user equipment 20 decides the transmission data quantity TBS=n4+Δ4 (n4 for example is 30 bits, and Δ4 for example is 5 bits) based on the measurement result of the reference signal (or based on the (downlink) channel quality) to perform transmission, and the resources used in each transmission may be fixed or elastic (i.e., PRBS is fixed or elastic).

In the above description, n1≥n2≥n3≥n4, and n1-n4 is pre-configured by the base station 10, and Δ1-Δ4 (i.e., refer to as difference value) is dynamically decided by the user equipment 20 based on the channel quality.

That is, in exemplary embodiment 3-3 of this disclosure, if the channel quality is better, then the data quantity transmitted by the user equipment each time can be more. Therefore, the transmission efficiency can be effectively increased.

Figure 13:
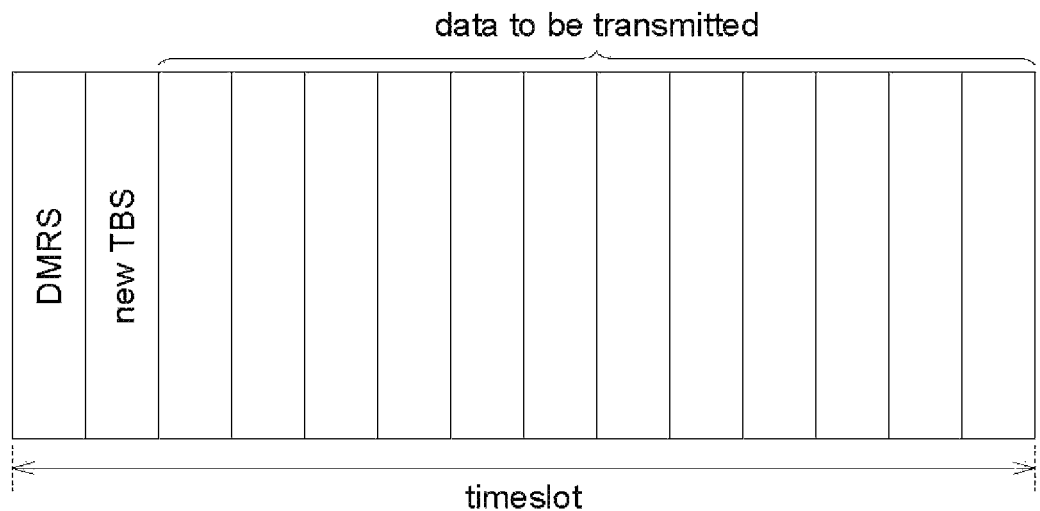
FIG. 13 shows a schematic diagram of the timeslot according to the exemplary embodiment 3-3 of this disclosure.

FIG. 13 shows a schematic diagram of the timeslot according to the exemplary embodiment 3-3 of this disclosure. As shown in FIG. 13, the timeslot may comprise a plurality of packet, wherein the sequence of the packets is: control information (for example but not limited to the demodulation reference signal (DMRS)), new TBS related information ((n1+Δ1)–(n4+Δ4) as described above), and the data to be transmitted.

That is, in exemplary embodiment 3-3 of this disclosure, the user equipment 20 can report new TBS value to the base station 10. In addition, the resource (PRBS) used in each transmission can be varied. In addition, the user equipment 20 can also report the periodicity of the uplink transmission period to the base station 10. For example, at least one periodicity of the uplink transmission period is pre-configured by the base station 10, and each periodicity of the uplink transmission period can be decided based on an index.

The exemplary embodiment 3-1A to the exemplary embodiment 3-1D, the exemplary embodiment 3-2A to the exemplary embodiment 3-2B, and the exemplary embodiment 3-3 are the sub-embodiments of the exemplary embodiment 3. The exemplary embodiment 3 of this disclosure can be implemented together with the exemplary embodiment 1 of this disclosure, or the exemplary embodiment 3 of this disclosure can be implemented alone (does not have to be implemented together with the exemplary embodiment 1 of this disclosure).

In addition, in other possible embodiments of this disclosure, for example, there are a plurality of channels (for example but not limited to 4) between the base station 10 and the user equipment 20. After the user equipment 20 measures each channel, the user equipment 20 decides 4 respective beamforming weights or 4 respective precoders. The user equipment 20 transmits 4 uplink reference signals to the base station 10 through the 4 channels, respectively, based on the decided respective beamforming weight or precoder. The base station 10 measures the uplink reference signal to estimate the 4 channels, and decides which one or more channel is better based on the channel estimation result. After that, the base station 10 transmits the reference signal index control signaling to the user equipment 20, to indicate that which one or more channel is decided by the base station. Each uplink reference signal is transmitted through the respective channel, and each uplink reference signal has a respective identifier. Therefore, the one or more channel decided by the base station 10 based on the channel estimation can be corresponded to the specific one or more uplink reference signal. The reference signal index control signaling comprises the identifier of the uplink reference signal, and based on the corresponding relationship between the uplink reference signal and the channel, the user equipment is indicated by the identifier of the uplink reference signal. In other implementation, the base station can encode the uplink reference signal, and in this case, the reference signal index control signaling comprises the encoded code of the uplink reference signal.

In response to the transmission of the uplink reference signal, the user equipment 20 receives the reference signal index control signaling, and chooses one or more from the 4 respective beamforming weights or the 4 respective precoders based on the reference signal index control signaling.

In other words, after the user equipment 20 transmits the uplink reference signal, the user equipment 20 can receive the reference signal index control signaling from the base station 10. After that, the user equipment 20 can perform the grant-free uplink transmission based on the chosen beamforming weight or precoder and through the channel indicated by the reference signal index control signaling.

In addition, in the above embodiments, the user equipment decides the beamforming weight or precoder based on the downlink reference signal transmitted by the base station 10. In other possible embodiments of this disclosure, the user equipment also can decide the beamforming weight or precoder based on the uplink reference signal. Or, in other possible embodiments of this disclosure, the user equipment also can decide the beamforming weight or precoder based on the uplink reference signal and the downlink reference signal. This is also within the spiritual range of this disclosure.

Figure 14:
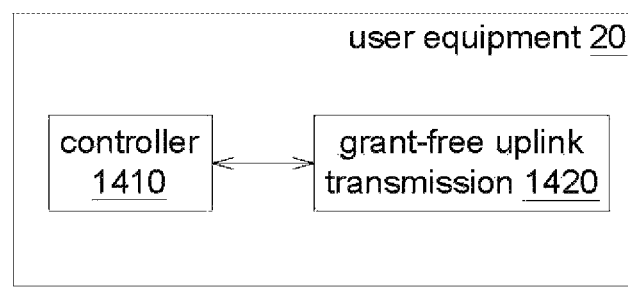
FIG. 14 discloses a functional block diagram of the user equipment according to the exemplary embodiment of this disclosure.

FIG. 14 discloses a functional block diagram of the user equipment according to the exemplary embodiment of this disclosure. As shown in FIG. 14, the user equipment 20 comprises: a controller 1410 and a wireless communication module 1420. The wireless communication module 1420 is coupled to the controller 1410. The wireless communication module 1420 can wirelessly communicate with the base station. The controller 1410 controls the user equipment 20 to perform the grant-free uplink transmission of the above embodiments, and the details are not repeated herein.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of grant-free uplink transmission for a user equipment, comprising:
   receiving a grant-free configuration parameter by the user equipment;
   receiving at least one reference signal by the user equipment;
   performing channel measurement based on the at least one reference signal by the user equipment;
   deciding at least one uplink beamforming weight or at least one precoder based on the at least one reference signal by the user equipment; and
   performing grant-free uplink transmission based on the decided at least one uplink beamforming weight or the at least one precoder and the grant-free configuration parameter by the user equipment.

2. The method of claim 1, wherein the grant-free configuration parameter comprises any combination of the following parameters: a code rate, a modulation order, a transport block size, a physical resource block size, a configured resource, a downlink reference signal related configuration, an uplink reference signal related configuration, a number of rank.

3. The method of claim 2, wherein deciding the code rate, the modulation order, the transport block size, and the physical resource block size is based on any combination of the followings: a transmission occasion within a transmission period, a number of transmission repetitions within the transmission period, a redundancy version sequence, a repetition pattern and a configured uplink transmission resource.

4. The method of claim 1, wherein each of the at least one reference signal comprises any combination of the followings: an uplink reference signal and a downlink reference signal.

5. The method of claim 1, wherein,
the at least one reference signal corresponds to at least one uplink transmission resource;
the step of deciding the at least one uplink beamforming weight or the at least one precoder by the user equipment based on the at least one reference signal comprises:
receiving a reference signal index control signaling by the user equipment; and
deciding, by the user equipment, the at least one uplink beamforming weight or the at least one precoder based on the reference signal indicated by the reference signal index control signaling; and
the method further comprises:
choosing, by the user equipment, one among the at least one uplink transmission resource based on the reference signal indicated by the reference signal index control signaling, wherein the user equipment further performs grant-free uplink transmission based on the chosen at least one uplink transmission resource.

6. The method of claim 5, wherein,
the user equipment receives a plurality of reference signals, and the step of the user equipment performing channel measurement based on the plurality of reference signals comprises reporting a channel measurement result, and the step of deciding the at least one uplink beamforming weight or the at least one precoder by the user equipment based on the plurality of reference signals further comprises: in response to the reported channel measurement result, receiving the reference signal index control signaling by the user equipment.

7. The method of claim 6, wherein the user equipment wirelessly communicates with a base station, and the method further comprises:
transmitting the reference signal index control signaling by the base station to the user equipment based on the channel measurement result received from the user equipment.

8. The method of claim 1, wherein,
the at least one reference signal corresponds to at least one uplink transmission resource, and the method further comprises:
choosing one among the at least one reference signal by the user equipment based on a channel measurement result; and
choosing one among the at least one uplink transmission resource by the user equipment based on the chosen at least one reference signal to perform grant-free uplink transmission.

9. The method of claim 8, wherein the step of deciding the at least one uplink beamforming weight or the at least one precoder by the user equipment based on the at least one reference signal further comprises:
deciding the at least one uplink beamforming weight or the at least one precoder by the user equipment based on the chosen at least one reference signal.

10. The method of claim 8, wherein the user equipment wirelessly communicates with a base station, and the method further comprises:
transmitting a reference signal index control signaling by the base station to the user equipment based on the channel measurement result received from the user equipment.

11. The method of claim 1, wherein,
the user equipment receives a plurality of reference signals, and a plurality of channels are measured based on the plurality of reference signals, and the step of deciding the at least one uplink beamforming weight or the at least one precoder by the user equipment based on the at least one reference signal comprises:
deciding a plurality of uplink beamforming weights or a plurality of precoders by the user equipment based on a channel measurement result;
receiving a reference signal index control signaling by the user equipment; and
choosing one among the plurality of uplink beamforming weights or the plurality of precoders by the user equipment based on the reference signal index control signaling,
wherein the user equipment performs grant-free uplink transmission based on the chosen uplink beamforming weight or the chosen precoder.

12. The method of claim 11, wherein the step of deciding the at least one uplink beamforming weight or the at least one precoder by the user equipment based on the at least one reference signal further comprises:
transmitting, by the user equipment, a plurality of uplink reference signals through the plurality of channels, respectively, based on the decided at least one uplink beamforming weight or the at least one precoder, wherein in response to transmission of the plurality of uplink reference signals, the user equipment receives the reference signal index control signaling.

13. The method of claim 1, wherein,
the user equipment decides a number of transmission repetitions and/or a resource usage and/or a data quantity per transmission based on a transmission occasion within a transmission period to perform grant-free uplink transmission.

14. The method of claim 1, wherein the user equipment wirelessly communicates with a base station, and the method further comprises:
transmitting the grant-free configuration parameter and the at least one reference signal by the base station.

15. A method of grant-free uplink transmission for a user equipment, comprising:
deciding a number of transmission repetitions and/or a resource usage and/or a data quantity per transmission based on a transmission occasion within a transmission period by the user equipment; and
performing grant-free uplink transmission based on the number of transmission repetitions and/or the resource usage and/or the data quantity per transmission by the user equipment.

16. The method of claim 15, further comprising:
receiving a grant-free configuration parameter by the user equipment;
receiving at least one reference signal by the user equipment;
performing channel measurement based on the at least one reference signal by the user equipment; and
deciding at least one uplink beamforming weight or at least one precoder based on a channel measurement result by the user equipment,
wherein the user equipment performs grant-free uplink transmission based on the number of transmission repetitions and/or the resource usage and/or the data quantity per transmission and the at least one uplink beamforming weight or the at least one precoder.

17. The method of claim 15, wherein the data quantity per transmission is a constant value, and the user equipment decides the number of transmission repetitions and the resource usage based on the transmission occasion within the transmission period.

18. The method of claim 15, wherein the resource usage is a constant value, and the user equipment decides the number of transmission repetitions and the data quantity per transmission based on the transmission occasion within the transmission period.

19. The method of claim 15, wherein the user equipment decides the number of transmission repetitions, the resource usage, and the data quantity per transmission based on the transmission occasion within the transmission period.

20. The method of claim 15, wherein the user equipment further decides the number of transmission repetitions and the data quantity per transmission based on a data quantity to be transmitted.

21. The method of claim 15, wherein the user equipment further decides the data quantity per transmission based on a channel quality, and the user equipment reports the decided data quantity per transmission.

22. A user equipment, comprising:
a controller; and
a wireless communication module coupled to the controller, and the controller is configured to control:
receiving a grant-free configuration parameter by the user equipment;
receiving at least one reference signal by the user equipment;
performing channel measurement based on the at least one reference signal by the user equipment;
deciding at least one uplink beamforming weight or at least one precoder based on the at least one reference signal by the user equipment; and
performing grant-free uplink transmission based on the decided at least one uplink beamforming weight or the at least one precoder and the grant-free configuration parameter by the user equipment.

23. The user equipment of claim 22, wherein the grant-free configuration parameter comprises any combination of the following parameters: a code rate, a modulation order, a transport block size, a physical resource block size, a configured resource, a downlink reference signal related configuration, an uplink reference signal related configuration, a number of rank.

24. The user equipment of claim 22, wherein deciding the code rate, the modulation order, the transport block size, and the physical resource block size is based on any combination of the followings: a transmission occasion within a transmission period, a number of transmission repetitions within the transmission period, a redundancy version sequence, a repetition pattern and a configured uplink transmission resource.

25. The user equipment of claim 22, wherein each of the at least one reference signal comprises any combination of the followings: an uplink reference signal and a downlink reference signal.

26. The user equipment of claim 22, wherein,
the controller is configured to control:
corresponding the at least one reference signal to at least one uplink transmission resource;
when the user equipment decides the at least one uplink beamforming weight or the at least one precoder based on the at least one reference signal,
the user equipment receives a reference signal index control signaling; and
the user equipment decides the at least one uplink beamforming weight or the at least one precoder based on the at least one reference signal indicated by the reference signal index control signaling; and
the user equipment chooses one among the at least one uplink transmission resource based on the at least one reference signal indicated by the reference signal index control signaling, wherein the user equipment further performs grant-free uplink transmission based on the chosen at least one uplink transmission resource.

27. The user equipment of claim 26, wherein,
the controller is configured to control:
receiving the at least one reference signal by the user equipment, and performing channel measurement by the user equipment based on the at least one reference signal, and reporting a channel measurement result; and
when the user equipment decides the at least one uplink beamforming weight or the at least one precoder based on the at least one reference signal, in response to the reported channel measurement result, the user equipment receives the reference signal index control signaling.

28. The user equipment of claim 27, wherein the user equipment wirelessly communicates with a base station, the base station transmits the reference signal index control signaling to the user equipment based on the channel measurement result received from the user equipment.

29. The user equipment of claim 22, wherein,
the controller is configured to control:
corresponding the at least one reference signal to at least one uplink transmission resource;
choosing one among the at least one reference signal by the user equipment based on a channel measurement result; and
choosing one among the at least one uplink transmission resource by the user equipment based on the chosen at least one reference signal to perform grant-free uplink transmission.

30. The user equipment of claim 29, wherein when the user equipment decides the at least one uplink beamforming weight or the at least one precoder based on the at least one reference signal, the user equipment decides the at least one uplink beamforming weight or the at least one precoder based on the chosen at least one reference signal.

31. The user equipment of claim 29, wherein the user equipment wirelessly communicates with a base station, the base station transmits a reference signal index control signaling to the user equipment based on the channel measurement result received from the user equipment.

32. The user equipment of claim 22, wherein the controller is configured to control:
receiving the at least one reference signal by the user equipment, and measuring a plurality of channels based on the at least one reference signal by the user equipment,
when the user equipment decides the at least one uplink beamforming weight or the at least one precoder based on the at least one reference signal, the user equipment decides the at least one uplink beamforming weight or the at least one precoder based on a channel measurement result;

the user equipment receives a reference signal index control signaling; and the user equipment chooses one among the at least one uplink beamforming weight or the at least one precoder based on the reference signal index control signaling;

wherein the user equipment performs grant-free uplink transmission based on the chosen at least one uplink beamforming weight or the at least one precoder.

33. The user equipment of claim 32, wherein, the controller is configured to control:

when the user equipment decides the at least one uplink beamforming weight or the at least one precoder based on the at least one reference signal, the user equipment transmits a plurality of uplink reference signals through the plurality of channels, respectively, based on the decided at least one uplink beamforming weight or the at least one precoder, wherein in response to transmission of the plurality of uplink reference signals, the user equipment receives the reference signal index control signaling.

34. The user equipment of claim 22, wherein, the user equipment decides a number of transmission repetitions and/or a resource usage and/or a data quantity per transmission based on a transmission occasion within a transmission period.

35. The user equipment of claim 22, wherein the user equipment wirelessly communicates with a base station, and the base station transmits the grant-free configuration parameter and the at least one reference signal.

36. A user equipment, comprising:

a controller; and a wireless communication module coupled to the controller, and the controller is configured to control:

deciding a number of transmission repetitions and/or a resource usage and/or a data quantity per transmission based on a transmission occasion within a transmission period by the user equipment; and performing grant-free uplink transmission based on the number of transmission repetitions and/or the resource usage and/or the data quantity per transmission by the user equipment.

37. The user equipment of claim 36, wherein the controller controls:

receiving a grant-free configuration parameter by the user equipment;

receiving at least one reference signal by the user equipment;

performing channel measurement by the user equipment based on the at least one reference signal; and deciding at least one uplink beamforming weight or at least one precoder by the user equipment based on a channel measurement result, wherein the user equipment performs grant-free uplink transmission based on the number of transmission repetitions and/or the resource usage and/or the data quantity per transmission and the at least one uplink beamforming weight or the at least one precoder.

38. The user equipment of claim 36, wherein the data quantity per transmission is a constant value, and the controller controls the user equipment to decide the number of transmission repetitions and the resource usage based on the transmission occasion within the transmission period.

39. The user equipment of claim 36, wherein the resource usage is a constant value, and the controller controls the user equipment to decide the number of transmission repetitions and the data quantity per transmission based on the transmission occasion within the transmission period.

40. The user equipment of claim 36, wherein the controller controls the user equipment to decide the number of transmission repetitions, the resource usage, and the data quantity per transmission based on the transmission occasion within the transmission period.

41. The user equipment of claim 36, wherein the controller controls the user equipment to further decide the number of transmission repetitions and the data quantity per transmission based on a data quantity to be transmitted.

42. The user equipment of claim 36, wherein the controller controls the user equipment to further decide the data quantity per transmission based on a channel quality, and the user equipment reports the decided data quantity per transmission.

* * * * *